US006259843B1

(12) United States Patent
Kondo (10) Patent No.: US 6,259,843 B1
(45) Date of Patent: Jul. 10, 2001

(54) OPTICAL CABLE, A METHOD OF LAYING AN OPTICAL CABLE, AND A DATA TRANSFER SYSTEM USING THE OPTICAL CABLE

(75) Inventor: Naohiro Kondo, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/393,969

(22) Filed: Sep. 10, 1999

(30) Foreign Application Priority Data

Sep. 22, 1998 (JP) ................................... 10-267820

(51) Int. Cl.⁷ ...................................... G02B 6/44
(52) U.S. Cl. ..................... 385/104; 385/100; 385/102; 174/117 F; 174/115; 174/117 R; 174/117 FF; 174/706; 174/97; 174/104
(58) Field of Search .................................. 385/100, 102, 385/103, 104, 106, 114; 174/49, 117 F, 115, 117 R, 113 R, 117 FF, 129 R, 70 C, 97, 104

(56) References Cited

U.S. PATENT DOCUMENTS

| Re. 36,592 | * | 2/2000 | Giebel ................................ 385/100 |
| 4,815,814 | * | 3/1989 | Ulijasz .............................. 350/96.23 |
| 5,043,531 | * | 8/1991 | Gutenson ............................. 174/49 |
| 5,180,890 | | 1/1993 | Pendergrass et al. . |
| 5,668,912 | | 9/1997 | Keller . |

FOREIGN PATENT DOCUMENTS

| 0600108A1 | * | 11/1992 | (DE) . |
| 0 600 108 | | 6/1994 | (EP) . |
| 1544203 | | 9/1968 | (FR) . |
| 1069666 | | 5/1967 | (GB) . |

* cited by examiner

Primary Examiner—Cassandra Spyrou
Assistant Examiner—Leo Boutsikaris
(74) Attorney, Agent, or Firm—Oliff & Berridge, PLC (57) ABSTRACT

In an optical cable, at least one optical fiber is enclosed in a cover. The cover has an outer surface which in cross-section is in the shape of a trapezium formed by removing the right-angled isosceles corner region from a right-angled isosceles triangle. The optical cable can be installed running along a corner with its two perpendicular side faces lying against the surfaces which define the corner. Alternatively, the cable can be installed on a flat surface with the wider of the mutually parallel faces lying against the flat surface.

9 Claims, 9 Drawing Sheets

OPTICAL CABLE, A METHOD OF LAYING AN OPTICAL CABLE, AND A DATA TRANSFER SYSTEM USING THE OPTICAL CABLE

BACKGROUND OF THE INVENTION

1. Field of the Invention

The present invention relates to an optical cable, for example an optical cable which can be used in a work place such as an office building to connect a plurality of devices which receive and/or transmit data. The invention further relates to a method of laying the optical cable, and a data transfer system using the optical cable.

2. Description of the Prior Art

It is known to transmit data to, from or between devices (appliances) in a room such as an office using a data transfer system which employs electric cables laid under the flooring. Such a system can be easily modified to cope with an alteration of office layout, such as movement of devices or an increase in the number of devices.

In the above system, a wiring channel which is approximately U-shaped in section is provided under the flooring. The wiring channel is in the shape of a matrix or grid, and has lower and side surfaces which extend perpendicularly to each other. Electric cables (each containing a plurality of copper electric wires) for transmission of signals are laid along the wiring channel and run out of the wiring channel into the room at positions corresponding to locations where devices are installed.

Because of the increase in multiplex communication in recent years, there is a growing demand for an "optical composite" data transfer system which uses both electric cables and optical cables for transmission of signals. In such a system, one or more optical cables for optical communication are laid in the wiring channel alongside the electric wire cables.

Figure 14:
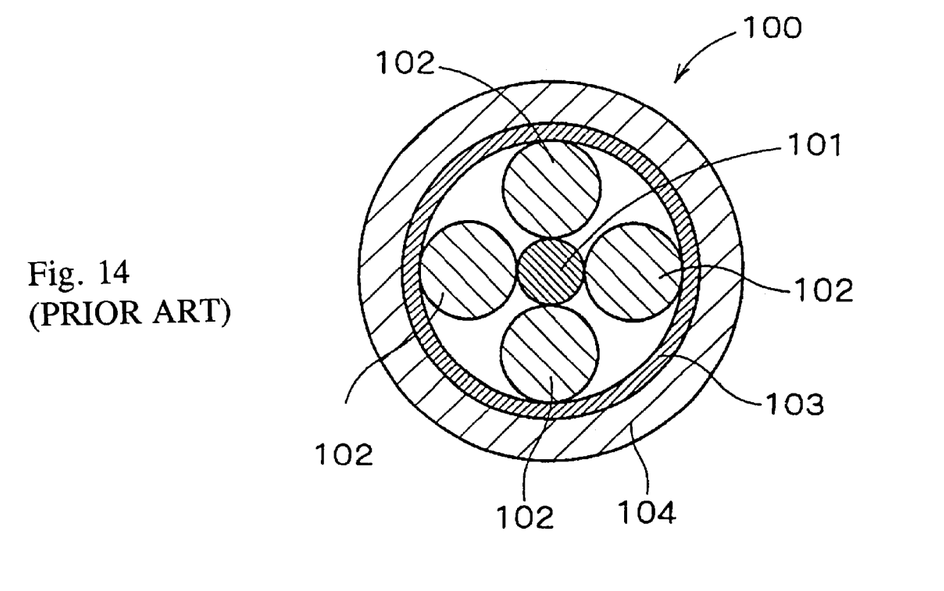
FIG. 14 is a sectional view of an optical cable having a conventional construction.

FIG. 14 is a sectional view showing an optical cable 100 having a conventional construction. The optical cable 100 includes four optical fibers 102 twisted together around a reinforcing tension member 101. A tape 103 is wound around the optical fibers 102, and a plastics covering layer 104 provided for protection around the tape 103. The tape 103 and the plastics covering layer 104 protect the optical fibers 102 from being subjected to external force.

However, the optical cable 100 as described above has a low degree of flexibility. Thus, the minimum permissible radius of curvature of the optical cable 100 may be as large as 100–120 mm. Thus, there are cases in which the optical cable 100 cannot be laid within a wiring channel formed in the shape of a matrix.

The optical cable 100 shown in FIG. 14 has another problem because of its large diameter. For example, the optical cable 100 may be too wide to be inserted into a wiring channel which already accommodates an electric wire.

BRIEF SUMMARY OF THE INVENTION

The present invention addresses the above problems. It is an object of the present invention to provide an optical cable which can have sufficient flexibility and can be installed efficiently in a wiring channel. The invention provides an optical cable which can be appropriately accommodated in a right-angled corner region of a wiring channel, and which when located on a flat surface projects to a relatively low extent from that surface.

Further objects of the invention are to provide a new and useful method of laying an optical cable, and a data transfer system using an optical cable.

Accordingly, the present invention provides an optical cable, comprising at least one optical fiber and a cover surrounding the fiber. The cover has an outer surface which in cross-section is in the shape of a trapezium formed by removing the right-angled isosceles corner region from a right-angled isosceles triangle. The word "trapezium" is used here to mean a quadrilateral having one pair of parallel sides (in USA the word "trapezoid" has this meaning).

Thus, the optical cable can be laid in an installation space along a right-angled corner region defined at the junction of a pair of mutually perpendicular surfaces of the walls of the space with its two mutually perpendicular faces lying against these mutually perpendicular surfaces. Alternatively, it can be laid on a flat surface with the longer of its two parallel faces lying against the flat surface. Since the profile of the cover is a trapezium, in this second case it obstructs other objects to a lower degree than a triangular cable.

The optical fiber may consist of a core element surrounded by one or more jacket layers, or alternatively the optical fiber may consist of an optically transmissive element in direct contact with the cover. Typically the optically transmissive element is a core surrounded by one or more cladding layers.

Preferably, a groove extending in the longitudinal direction is formed on at least one main surface of the cover. The groove facilitates tearing of the cover, for example to gain access to one of the optical fibers.

Preferably, at least one reinforcing fiber is provided inside the cover extending in the longitudinal direction.

Preferably, an end portion of the optical fiber extends longitudinally beyond the cover, and this end portion of the optical fiber is attached to a connector.

In a second aspect, the invention provides a method of laying (installing) the optical cable according to the invention in a corner region or on a flat installing surface.

In a third aspect the invention provides a data transfer system which includes the optical cable according to the invention, optionally in combination with at least one electric data transfer cable.

BRIEF DESCRIPTION OF THE DRAWINGS

Embodiments of the invention will now be described by way of non-limitative example with reference to the accompanying drawings, in which.

DETAILED DESCRIPTION OF THE PREFERRED EMBODIMENTS

An optical cable according to a first embodiment of the present invention will be described below with reference to the drawings.

Figure 1:
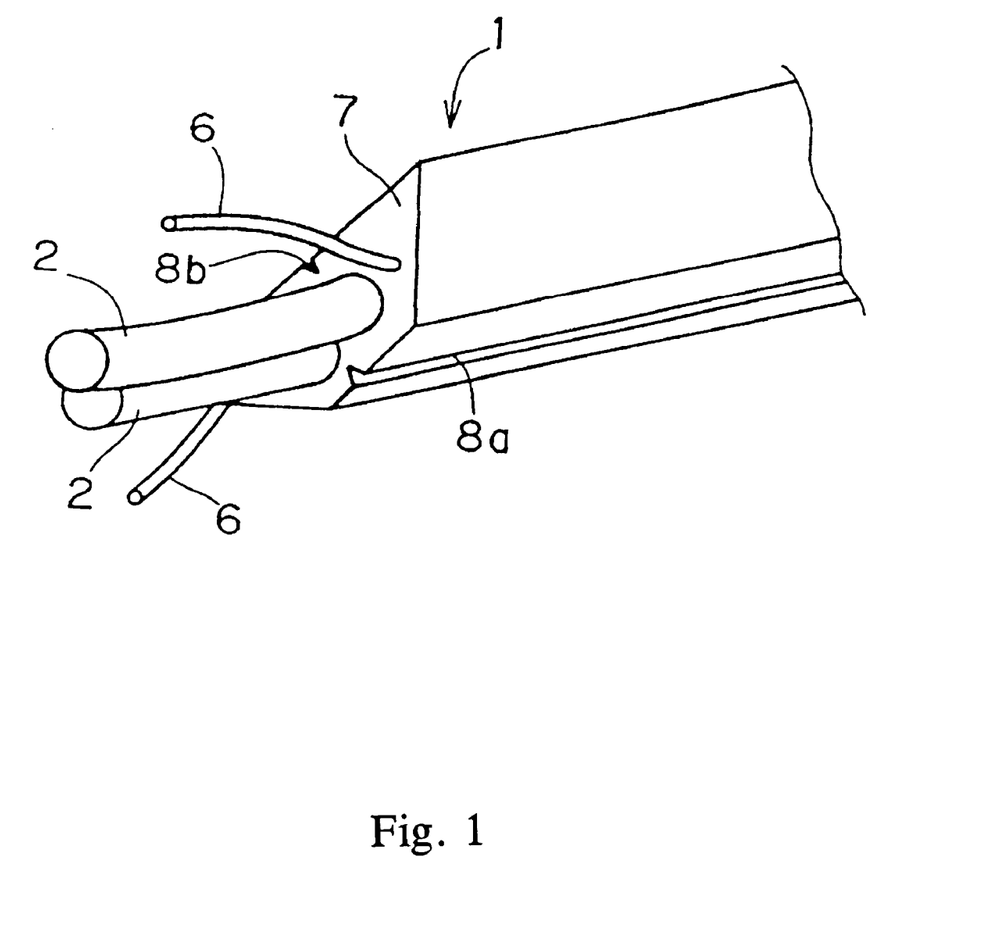
FIG. 1 is a perspective view of an optical cable which is a first embodiment of the present invention.
Figure 2:
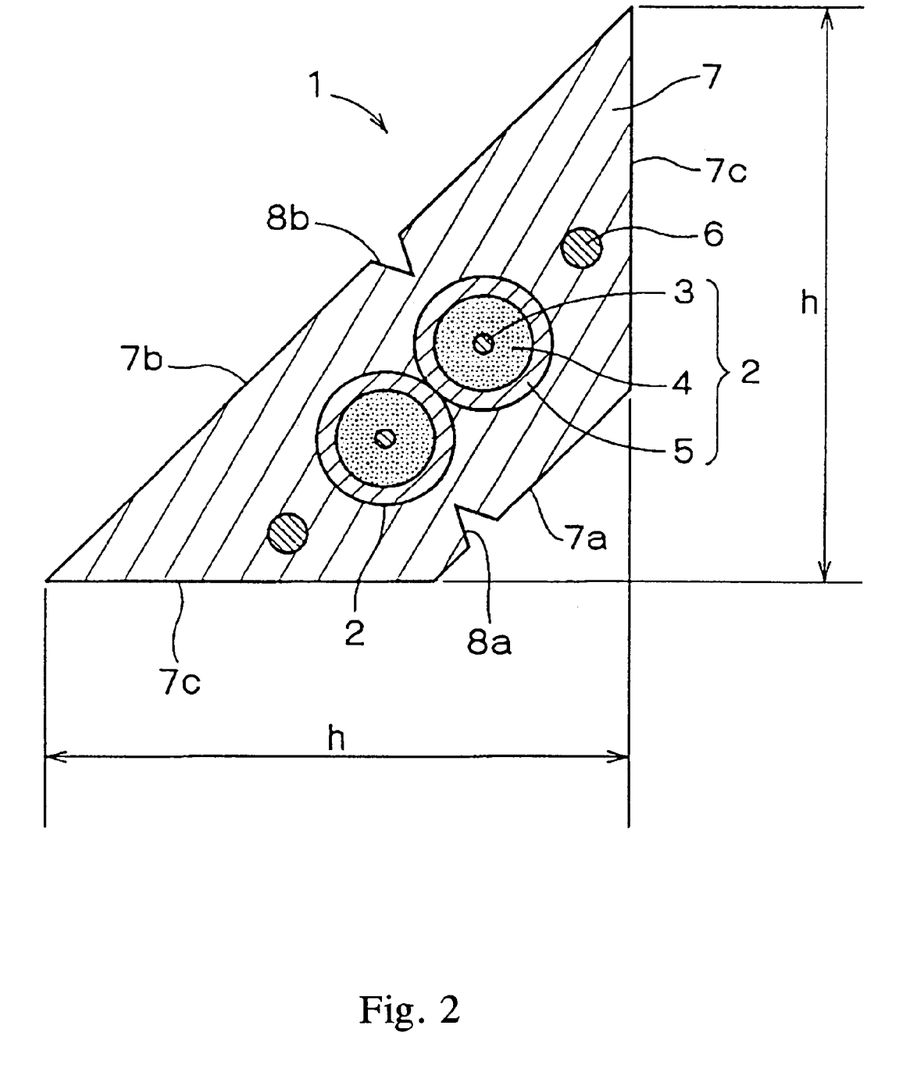
FIG. 2 is sectional view of the optical cable shown in FIG. 1.

As shown in FIGS. 1 and 2, an optical cable 1 is formed of two optical fibers 2 arranged in parallel with each other and a cover 7 in the form of a solid body formed on the periphery of the two optical fibers 2 by extrusion molding. The fibers 2 are thus embedded in the cover 7.

Each optical fiber 2 is constructed of an optical fiber element 3, a buffer layer 4 made of aramid fiber material such as Kevlar (trade mark of Du Pont) provided on the periphery of the element 3, and a jacket 5 provided on the periphery of the buffer layer 4. The jacket 5 is made of polyvinyl chloride (PVC) or the like.

The optical fiber element 3 consists of a core and cladding, and a covering layer made of ultraviolet-curing plastics material.

The cover 7 is made of flexible plastics material such as PVC or the like. In the present invention, the sectional shape of the cover 7 is a trapezium formed by removing the right-angled isosceles corner region from a right-angled isosceles triangle. In other words the section shape of the cover has generally two parallel surfaces 7a, 7b and two mutually perpendicular side surfaces 7c of equal length joining the parallel surfaces 7a, 7b.

An approximately V-shaped groove or notch 8a is formed on the surface 7a (hereinafter referred to a first main surface) which is the shorter side of the two parallel sides of the trapezium. The groove 8a is formed extending in the longitudinal direction at a position on the first main surface 7a corresponding to one of the optical fibers 2. Similarly, an approximately V-shaped groove or notch 8a is formed on a surface 7b (hereinafter referred to as the second main surface) which is the longer side of the two parallel sides of the trapezium.

The groove 8b is formed extending in the longitudinal direction at a position on the surface 7b corresponding to the other of the optical fibers 2.

Thus, it is easy to tear the cover 7 at the portions where the grooves 8a and 8b are formed. Thus, it is easy to take out the optical fibers 2 from the cover 7.

The two grooves 8a, 8b do not substantially alter the general trapezium shape of the outer surface of the cover 7. As can be seen the cover has no portion projecting outside the trapezium envelope.

A pair of reinforcing fibers 6 are provided embedded in the cover 7 extending parallel to the optical fibers 2 such that the reinforcing fibers 6 are located outward from the optical fibers 2 i.e. closer to the side surfaces 7c. The reinforcing fibers 6 serve as a means for reinforcing the tensile strength of the optical cable 1, preventing the optical fiber 2 from being bent in the cover 7, and imparting an appropriate degree of bending stress to the optical cable 1 to facilitate handling of the optical cable 1. A steel wire or the like is used as the material of each reinforcing fiber 6.

Flexible plastics to form the cover 7 is applied by extrusion molding to the periphery of the reinforcing fiber 6 coated with an adhesive agent. Consequently, the reinforcing fiber 6 and the cover 7 are bonded to each other. Thus, the reinforcing fiber 6 is prevented from being moved inside the cover 7 and being removed therefrom.

In the embodiment, a reinforcing fiber 6 having a diameter of 0.4 mm is used to set the permissible range of the radius of curvature of the optical cable 1 to 30–50 mm.

The construction of the optical cable 1 is as described above. The method of laying the optical cable 1 will be described below.

Figure 3:
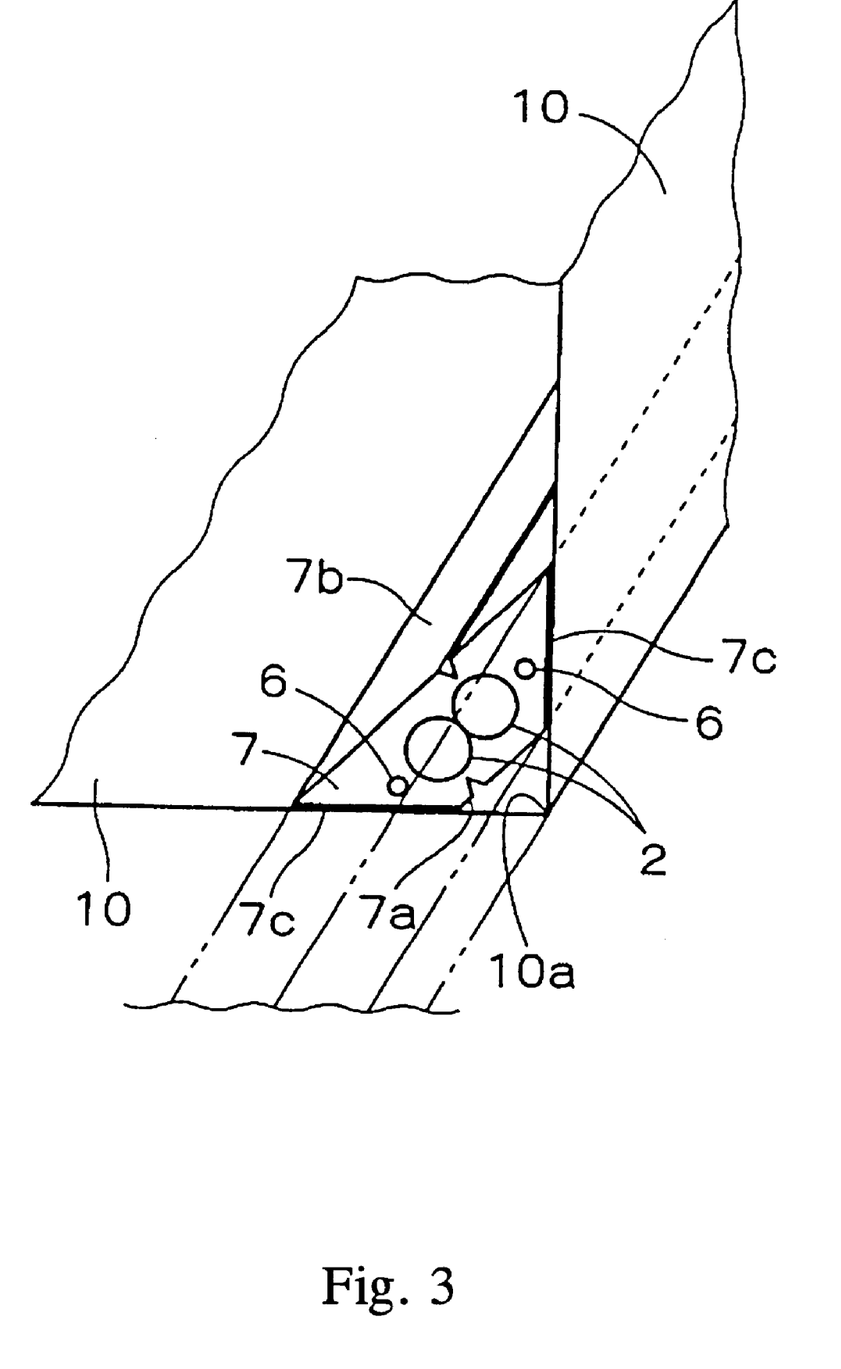
FIG. 3 is a perspective view illustrating a method of laying the optical cable according to the invention.

Referring to FIG. 3, in laying the optical cable 1 along a right-angled corner region 10a formed of a pair of surfaces 10 intersecting with each other perpendicularly, each of the side surfaces 7c is laid flat on a respective surface 10 so that the first main surface 7a faces the right-angled corner.

Figure 4:
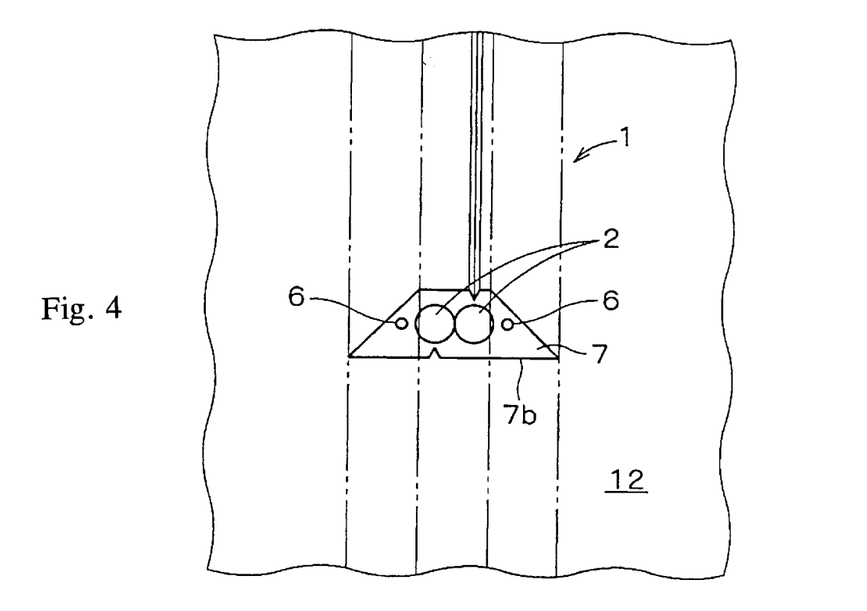
FIG. 4 is a perspective view illustrating another method of laying the optical cable according to the invention.

In laying the optical cable 1 on a flat installing surface 12, as shown in FIG. 4, the second main surface 7b of the cover 7 is laid flat on the surface 12.

Methods of laying the optical cable 1 will be described below in detail. Generally, a floor panel having a wiring channel extending in the shape of a cross is laid under a floor of an office.

Figure 5:
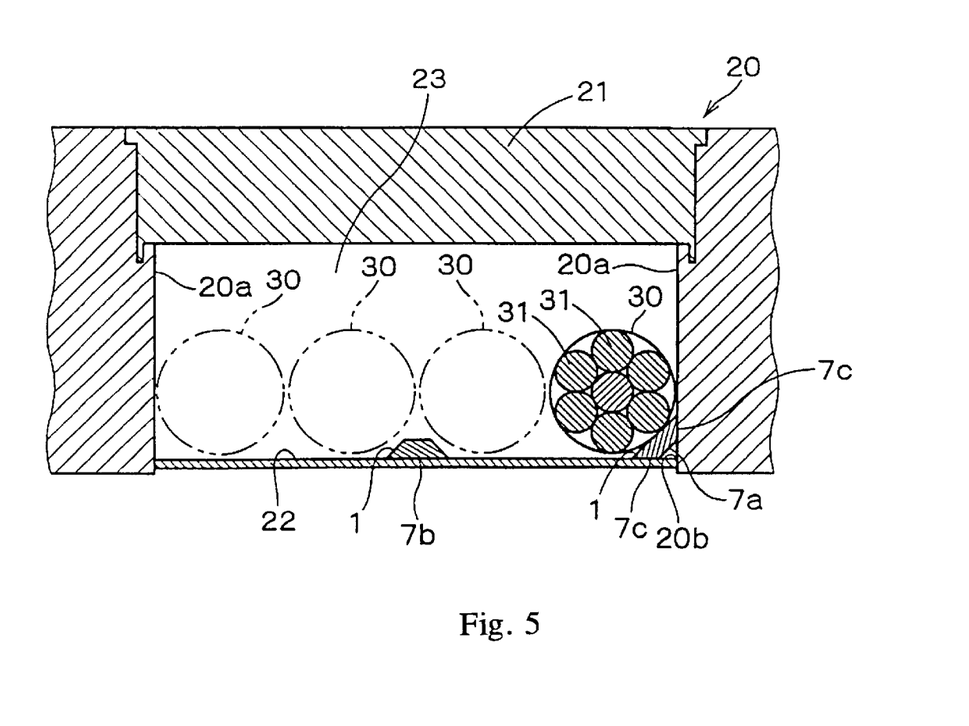
FIG. 5 is a sectional view showing the optical cable of FIG. 1 accommodated in a first location in a wiring channel.
Figure 6:
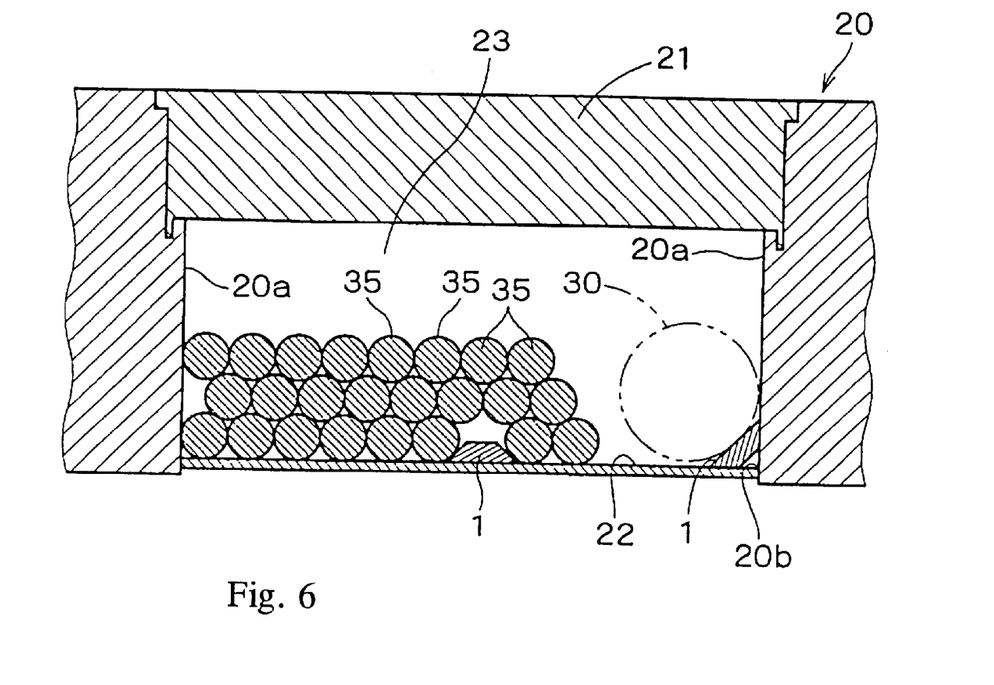
FIG. 6 is a sectional view showing the optical cable of FIG. 1 accommodated in a second location in a wiring groove.

FIGS. 5 and 6 are sectional views showing a wiring channel 23 formed inside a floor panel 20. The wiring channel 23 is formed of a bottom surface 22 and two side surfaces 20a perpendicular to the bottom surface 22. Thus the wiring channel 23 is approximately U-shaped. A cover 21 can be removably inserted (from the upper direction as shown in FIG. 5) to close the wiring channel 23.

As shown in FIG. 5, the wiring channel 23 accommodates four electrical cables 30 having a comparatively large diameter and accommodating a plurality of bundled electric wires 31 for transmission of signals. The diameter of the electric cables 30 is such that there is no gap widthwise between the cables 30 and the side surfaces 20a.

The optical cable 1 is laid in the wiring channel 23 by either or both of two methods. In one method, it is laid on the right-angled corner region 20b constructed of the bottom surface 22 and the side surface 20a. In the other method, it is laid on the bottom surface 22 such that it is located between adjacent cables 30.

In a first method, the side surfaces 7c of the cover 7 are installed on the bottom surface 22 and the side surface 20a respectively proximate to the right-angled corner region 20b of the wiring channel 23, such that each side surface 7c contacts the bottom surface 22 or the side surface 20a closely, and the first main surface 7a of the cover 7 of the optical cable 1 faces the right-angled corner region 20b. In this manner, the optical cable 1 is laid in the wiring channel 23 along the longitudinal direction thereof.

In this case, supposing that the width of the accommodating part of the wiring groove 23 is 75 mm and the height thereof is 31 mm and that the diameter of the cable 30 to be accommodated therein is 16–18 mm, the width h (see FIG. 2) along the side surface 7c of the optical cable 1 is about 6 mm. The optical fibers 2 have a diameter of 1.5 mm and contain optical fiber elements 3 having a diameter of 0.25 mm.

In a second method, the optical cable 1 is laid by contacting the second main surface 7b of the cover 7 of the optical cable 1 with the bottom surface 22 of the wiring channel 23 along a border line between cables 30 adjacent to each other in the wiring channel 23. For example, an optical cable 1 is laid along the center line of the bottom surface 22 in its widthwise direction.

In FIG. 6, the wiring channel 23 accommodates one comparatively large diameter electric cable 30 (having a plurality of electric wires 31 for transmission of signals) and a plurality of comparatively small diameter cables 35 in the remaining part of the channel. In this case, a first optical cable 1 is located, by a method similar to the laying method shown in FIG. 3, on the right-angled corner region 20b proximate the cable 30.

A second optical cable 1 is accommodated along a predetermined longitudinal line proximate (or at) the widthwise center of the bottom surface 22, by a method similar to the laying method shown in FIG. 4. This optical cable 1 therefore occupies a space which would otherwise be occupied by the cables of comparatively small diameter.

In accommodating the optical cable 1 in the wiring channel 23, as shown in FIGS. 5 and 6, it is possible to accommodate the optical cable 1 appropriately in the dead space of the wiring channel 23 without the optical cable 1 interfering with cables 30 and 35 accommodated therein. Thus, it is easy to lay the optical cable 1 in the wiring channel 23 in combination with the cables 30 and 35.

A portion of the optical cable 1 which extends out of the wiring channel 23 may be installed on a flat installing surface, such as the surface of the floor or a wall surface, using the method shown in FIG. 4.

In laying the optical cable 1 on the flat installing surface 12, as shown in FIG. 4, the upper surface of the optical cable 1 projects by only a small amount from the installing surface 12.

Thus, when the optical cable 1 is laid at the center of the bottom surface 22 of the wiring channel 23 in the widthwise direction of the bottom surface 22, it is possible to prevent the optical cable 1 from interfering with other cables 30 and 35 accommodated in the wiring channel 23. Further, when the optical cable 1 is laid on a wall surface or a floor surface, it is possible to reduce the risk of it interfering with equipment etc.

The optical cable 1 is fixed by methods which will be described below.

Figure 7:
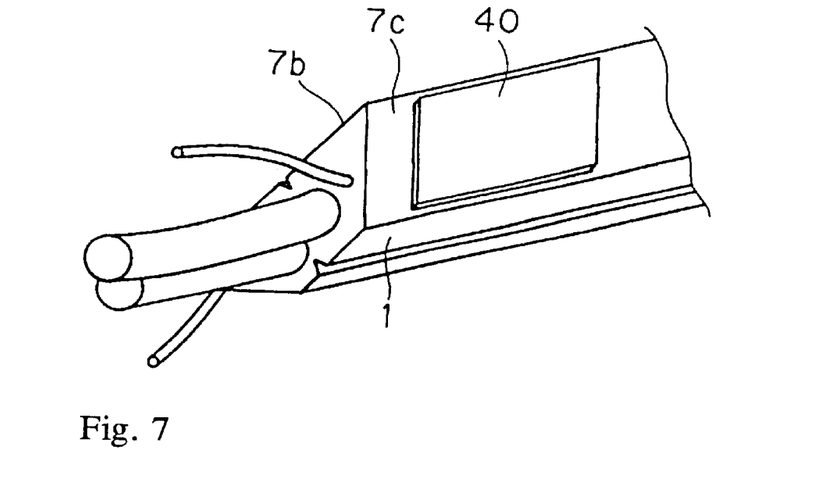
FIG. 7 is a perspective view illustrating a further method of laying an optical cable according to the invention.

In laying the optical cable 1 by the method shown in FIG. 3, a double-coated tape 40 is bonded to one or both of the side surfaces 7c of the cover 7 at regular intervals as shown in FIG. 7, and then, the double-coated tape 40 is bonded to the installing surfaces 10.

In laying the optical cable 1 by the method shown in FIG. 4, the double-coated tape 40 is bonded to the second main surface 7b of the cover 7, then the optical cable 1 is fixed to the installing surface 12 using the double-coated tape 40.

Figure 8:
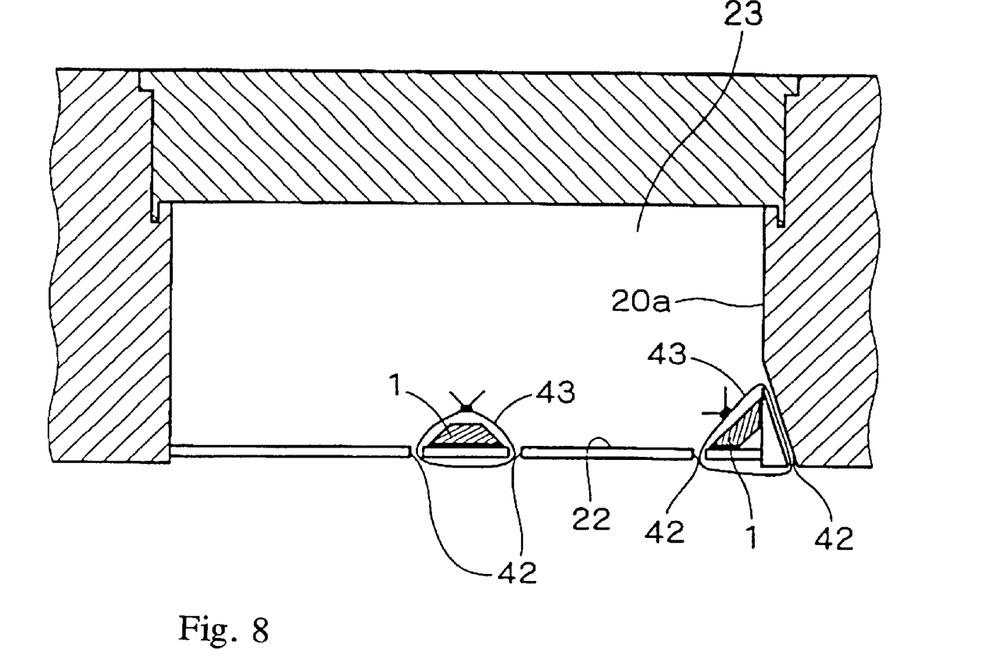
FIG. 8 is a sectional view showing a further method of laying an optical cable according to the invention.

A further method of laying optical cable(s) in the wiring channel 23 is shown in FIG. 8. For each optical cable, a pair of installing holes 42 are formed penetrating through the bottom surface 22 and/or the side surface 20a at regular intervals along the line on which the optical cable 1 is laid. A wire 43 or the like is inserted threaded through the installing holes 42, and the optical cable 1 is bound with the wire 43.

Figure 9:
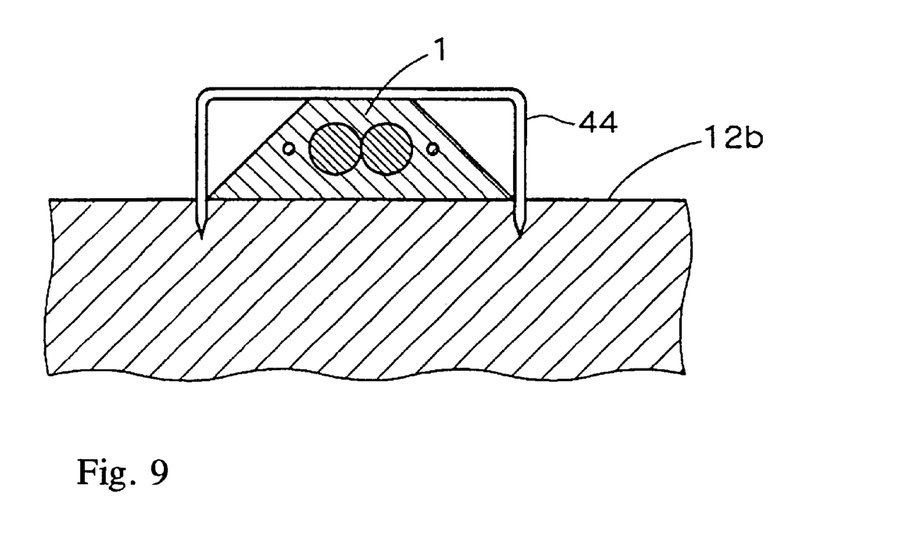
FIG. 9 is a sectional view showing still another method of laying an optical cable according to the invention.

In a method of laying the optical cable 1 on a floor 12b of an office or the like, as shown in FIG. 9, both ends of an approximately U-shaped metal fitting 44 are driven into the floor 12b, with the optical cable 1 being held by the metal fitting 44.

Figure 10:
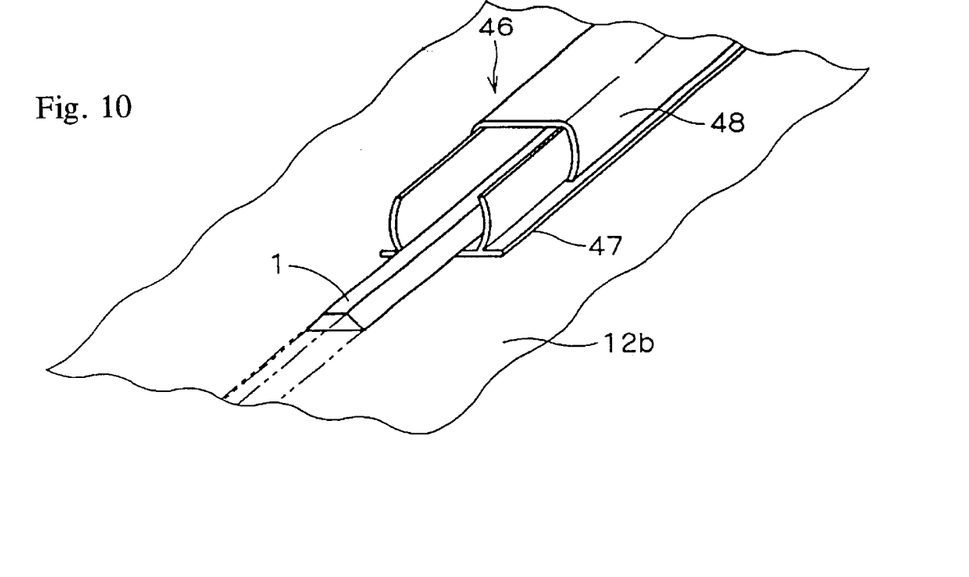
FIG. 10 is a sectional view showing still another method of laying an optical cable according to the invention.

As shown in FIG. 10, it is possible to accommodate the optical cable (either the whole length of the optical cable or one or more mutually spaced sections of the optical cable) in a wiring duct 46 consisting of: a base 47 which has an approximately U-shaped accommodating channel and a second main surface which is bonded to a floor surface 12b; and a cover 48 which is installed on the base 47 to cover and close the accommodating channel. The base 47 may be made of metal and be fixed to the floor surface 12b with screws.

Figure 11:
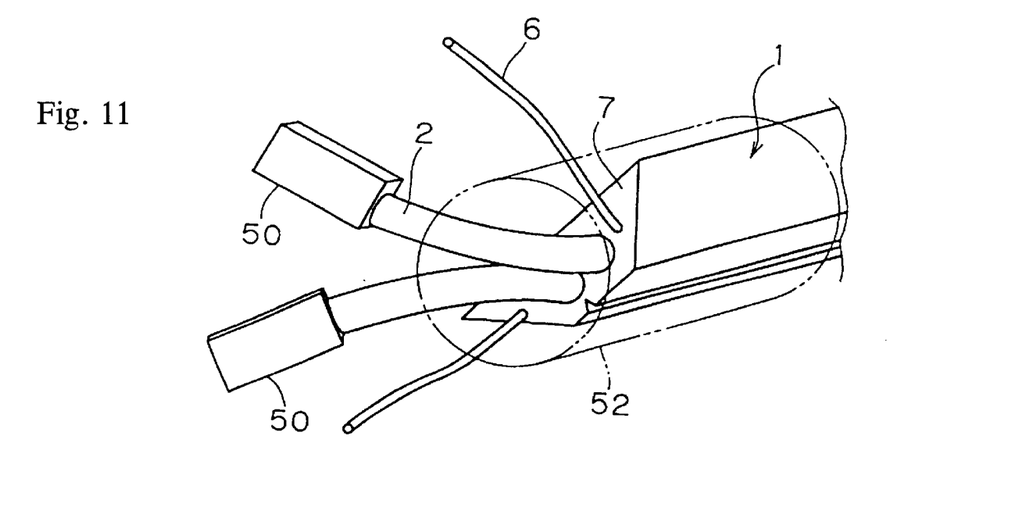
FIG. 11 is a perspective view showing a connector installed on an end of the optical cable.

As shown in FIG. 11, it is possible to take out the optical fibers 2 from an end of the optical cable 1 by removing part of the cover 7. Connectors 50 can be installed on the fibers 2 so that they can be connected with data receiving and/or transmitting devices. The optical cable 1 thus prepared can be used at a work place such as an office.

It is not necessary to install the connectors 50 on the end of each of the optical fibers 2 at the work place itself. Instead, the connectors 50 may be attached to the optical fibers 2 before the optical cable 1 is taken to the work place. Therefore, the optical cable 1 can be laid at the work place in a short time (for example, in a limited holiday period) and easily (even by a person who is not skilled in this kind of job).

For protection, a heat-shrinkable tube 52 may be installed on the optical cable 1 so as to cover an end portion of the cover 7.

The reinforcing fiber 6 (which projects from the end of the cover 7 to about the same extent as the optical fibers 2) can be fixed in position (e.g. to the wiring channel 23 or to a portion proximate the device to which the connector 50 is connected). In this case, even when the optical cable 1 is subjected to a tensile force after it has been laid, the reinforcing fiber 6 receives the tensile force, thus reducing the force applied to the connector 50.

Figure 12:
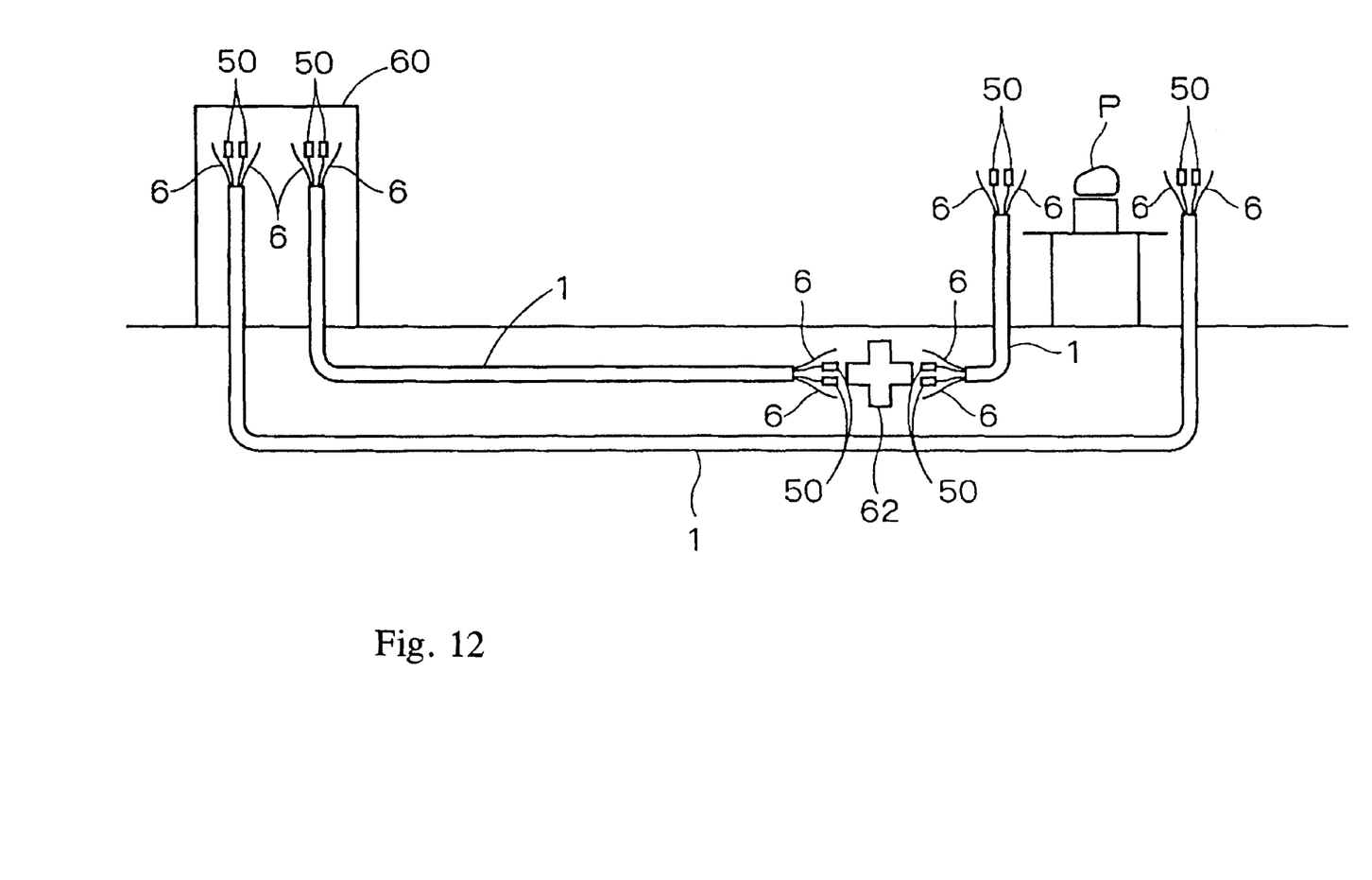
FIG. 12 shows schematically a data transfer system using an optical cable according to the invention.

An example of a data transfer system constructed using the optical cable 1 is shown in FIG. 12.

In the example, at a predetermined position of an office, there is provided a rack device 60 which is used as a control device for a network and has a plurality of connectors to be connected with optical fibers. A data receiving and/or transmitting device which is a personal computer P or the like is installed at a predetermined position of the office.

A wiring channel is formed in the shape of a matrix under a floor panel of the office (not shown in FIG. 12).

In this case, the optical cable 1 extends from the rack device 60 and is connected to the personal computer P through the wiring channel, either directly or through a zone receptacle 62 installed in the wiring channel. In the latter case, a connector is provided at each end of the cross-shaped zone receptacle 62 to perform a branch connection of the optical cable 1. Although, as described, the zone connector may be cross-shaped, other shapes too are possible.

Connectors 50 at each end of the optical cable 1 are connected respectively to connectors of the rack device 60, connectors of the personal computer P or connectors of the zone receptacle 62. The reinforcing fibers 6 leading out from the end of the optical cable 1 are fixed to positions respectively proximate the connectors 50.

Portions of the optical cable 1 which are inside the wiring channel are fixed there by the method shown in FIG. 3 or 4. Portions of the optical cable 1 outside the wiring groove are fixed to a floor surface by the method shown in FIG. 4.

Figure 13:
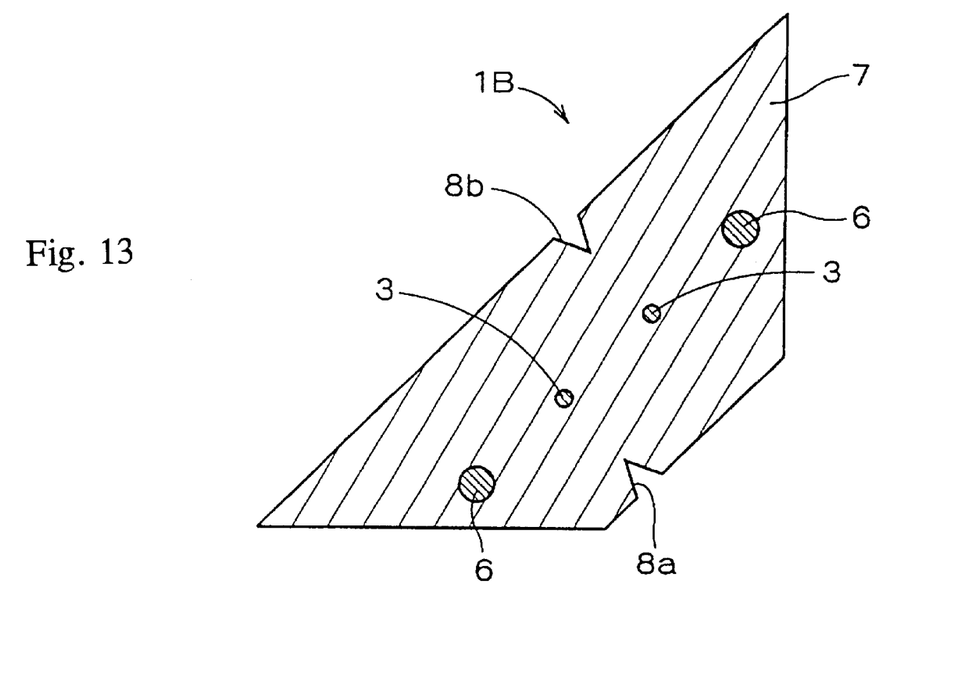
FIG. 13 is a sectional view of a second embodiment of an optical cable according to the present invention.

The optical cable 1 of the first embodiment is formed of the optical fiber 2 consisting of the element 3, the aramid fiber 4 provided thereon, and the covering portion 5 covering the aramid fiber layer 4. However, the invention is not limited in this respect. In an alternative construction, the element 3 is not provided with the aramid fiber layer 4 and the covering portion 5, as shown in FIG. 13. Since the optical fiber element 3 is not provided with the aramid fiber 4 and the covering portion 5, the diameter of the optical cable 1 can be made smaller.

Although the invention has been described above in relation to particular embodiments, many variations are possible within the spirit and scope of the invention herein described, as will be clear to an expert.

What is claimed is:

1. An optical cable for installation in a wiring channel having two mutually perpendicular surfaces and containing at least one electric cable therein, the optical cable comprising:

at least one optical fiber; and a cover surrounding said at least one optical fiber, the cover having an outer surface which in cross-section is in a shape of a trapezoid formed by removing a right-angled isosceles corner region from a right-angled isosceles triangle, whereby the cover has two non-adjacent mutually perpendicular side faces, the non-adjacent mutually perpendicular side faces fitting flush against respective ones of the mutually perpendicular surfaces of the wiring channel so that the optical cable fits into a dead space formed between the mutually perpendicular surfaces of the wiring channel and the at least one electric cable.

2. An optical cable according to claim 1, further comprising at least one reinforcing fiber, the reinforcing fiber being inside said cover and orientated in a longitudinal direction of said cover.

3. An optical cable according to claim 1, wherein an end portion of said optical fiber extends longitudinally beyond said cover, and said end portion of the optical fiber is attached to a connector.

4. An optical cable according to claim 1, wherein the outer surface of said cover comprises a plurality of mutually parallel faces, and at least one of the mutually parallel faces of said cover includes a groove which extends in a longitudinal direction of said cover and facilitates tearing of the cover.

5. A method of laying an optical cable along a wiring channel, the wiring channel including a corner region having a right-angled corner extending in a longitudinal direction of the wiring channel and defined between two mutually perpendicular surfaces, the optical cable comprising at least one optical fiber and a cover surrounding said at least one optical fiber, the cover having a longitudinal axis and an outer surface which in cross-section is in a shape of a trapezoid formed by removing a right-angled isosceles corner region from a right-angled isosceles triangle thereby having a pair of mutually parallel first faces and a pair of non-adjacent mutually perpendicular side faces, the method including:

laying said optical cable longitudinally along said corner region with one of said first faces facing said corner and said side faces lying against respective ones of said mutually perpendicular surfaces; and laying at least one electric cable along said corner region, the optical cable lying in a dead space formed between the mutually perpendicular surfaces and the at least one electric cable.

6. A method of laying an optical cable along a wiring channel, the wiring channel including a flat region defined by a flat installing surface, the optical cable comprising at least one optical fiber and a cover surrounding said at least one optical fiber, the cover having a longitudinal axis and an outer surface which in cross-section is in a shape of a trapezoid formed by removing a right-angled isosceles corner region from a right-angled isosceles triangle thereby having a pair of mutually parallel first faces and a pair of non-adjacent mutually perpendicular side faces, the method including:

laying said optical cable on said flat region with a wider one of said first faces lying against said installing surface; and laying a plurality of electric cables along the flat installing surface, the optical cable lying in a dead space formed between two of the electric cables and the flat installing surface.

7. A data transfer system including an optical cable for installation in a wiring channel having two mutually perpendicular surfaces and containing at least one electric cable therein, the optical cable comprising:

at least one optical fiber; and a cover surrounding said at least one optical fiber, the cover having an outer surface which in cross-section is in a shape of a trapezoid formed by removing a right-angled isosceles corner region from a right-angled isosceles triangle, whereby the cover has two non-adjacent mutually perpendicular side faces, the non-adjacent mutually perpendicular side faces fitting flush against respective ones of the mutually perpendicular surfaces of the wiring channel, and the optical cable fitting into a dead space formed between the mutually perpendicular surfaces of the wiring channel and the at least one electric cable.

8. A data transfer system comprising:

a wiring channel including a corner region having a right-angled corner extending in a longitudinal direction of the wiring channel and defined between two mutually perpendicular surfaces;

an optical cable comprising at least one optical fiber and a cover surrounding said at least one optical fiber, the cover having a longitudinal axis and an outer surface which in cross-section is in a shape of a trapezoid formed by removing a right-angled isosceles corner region from a right-angled isosceles triangle thereby having a pair of mutually parallel first faces and a pair of non-adjacent mutually perpendicular side faces; and at least one electric cable;

said optical cable lying along said corner region with one of said first faces facing said corner and said side faces lying against respective ones of said mutually perpendicular surfaces, said optical cable lying in a dead space formed between the mutually perpendicular surfaces and the at least one electric cable.

9. A data transfer system comprising:

a wiring channel including a flat region defined by a flat installing surface;

an optical cable comprising at least one optical fiber and a cover surrounding said at least one optical fiber, the cover having a longitudinal axis and an outer surface which in cross-section is in a shape of a trapezoid formed by removing a right-angled isosceles corner region from a right-angled isosceles triangle thereby having a pair of mutually parallel first faces and a pair of non-adjacent mutually perpendicular side faces; and a plurality of electric cables;

said optical cable lying on said flat region with a wider one of said first faces lying against said installing surface, said optical cable lying in a dead space formed between the flat installing surface and two of the electric cables.

* * * * *